(12) United States Patent
Lecomte et al.

(10) Patent No.: US 8,903,089 B2
(45) Date of Patent: Dec. 2, 2014

(54) DEVICE FOR SECURE TRANSMISSION RECORDING AND VISUALIZATION OF AUDIOVISUAL PROGRAMS

(71) Applicant: Nagra France SAS, Paris (FR)

(72) Inventors: Daniel Lecomte, Paris (FR); Joel Wenger, Nyon (CH)

(73) Assignee: Nagra France (FR)

( * ) Notice: Subject to any disclaimer, the term of this patent is extended or adjusted under 35 U.S.C. 154(b) by 22 days.

(21) Appl. No.: 13/733,944

(22) Filed: Jan. 4, 2013

(65) Prior Publication Data

US 2013/0121670 A1 May 16, 2013

Related U.S. Application Data

(63) Continuation-in-part of application No. 10/501,858, filed as application No. PCT/FR03/00122 on Jan. 15, 2003, now Pat. No. 8,374,348.

(30) Foreign Application Priority Data

Jan. 18, 2002 (FR) ...................... 02 00635

(51) Int. Cl.
| | |
|---|---|
| *H04L 29/00* | (2006.01) |
| *H04N 21/63* | (2011.01) |
| *H04N 21/462* | (2011.01) |
| *H04N 21/418* | (2011.01) |
| *H04N 19/88* | (2014.01) |
| *H04L 29/06* | (2006.01) |
| *H04N 21/4147* | (2011.01) |
| *H04N 21/2347* | (2011.01) |

(Continued)

(52) U.S. Cl.
CPC ....... *H04N 19/00927* (2013.01); *H04N 21/631* (2013.01); *H04N 2005/91328* (2013.01); *H04N 21/4622* (2013.01); *H04N 21/418* (2013.01); *H04L 65/602* (2013.01); *H04N 21/4147* (2013.01); *H04L 29/06027* (2013.01); *H04N 21/23476* (2013.01); *H04N 21/4385* (2013.01); *H04N 5/907* (2013.01); *H04N 9/8042* (2013.01); *H04N 21/2389* (2013.01); *H04N 5/781* (2013.01); *H04L 65/4076* (2013.01); *H04N 2005/91364* (2013.01); *H04N 5/913* (2013.01)
USPC .............. 380/216; 713/156; 713/165; 726/26

(58) Field of Classification Search
USPC ................... 713/156, 165; 726/26; 707/104.1
See application file for complete search history.

(56) References Cited

U.S. PATENT DOCUMENTS

| | | | | |
|---|---|---|---|---|
| 5,418,569 A | * | 5/1995 | Ando | ........................ 375/240.04 |
| 5,712,976 A | | 1/1998 | Falcon et al. | |

(Continued)

FOREIGN PATENT DOCUMENTS

| | | |
|---|---|---|
| EP | 0778513 | 6/1997 |
| WO | 99/08428 A1 | 2/1999 |

(Continued)

*Primary Examiner* — Brandon Hoffman
*Assistant Examiner* — Michael D Anderson
(74) *Attorney, Agent, or Firm* — DLA Piper LLP (US)

(57) ABSTRACT

Methods and systems are disclosed for distributing video sequences in a coded stream. The methods and systems include analyzing an original coded stream, generating at least one modified coded sub-frame, generating, based upon the analysis, a modified stream and a second stream by replacing an original coded sub-frame by the modified coded sub-frame, so that the modification from the original coded sub-frame results in a visually altered video sequence, transmitting the first and the second generated streams, and reconstructing the original stream using the modified coded sub-frame contained in the second stream.

7 Claims, 3 Drawing Sheets

(51) Int. Cl.
  *H04N 21/4385* (2011.01)
  *H04N 21/2389* (2011.01)
  *H04N 5/913* (2006.01)
  *H04N 5/907* (2006.01)
  *H04N 9/804* (2006.01)
  *H04N 5/781* (2006.01)

(56) References Cited

U.S. PATENT DOCUMENTS

| | | | |
|---|---|---|---|
| 5,892,825 A | 4/1999 | Mages et al. | |
| 5,937,164 A | 8/1999 | Mages et al. | |
| 6,035,329 A | 3/2000 | Mages et al. | |
| 6,185,306 B1 | 2/2001 | Mages et al. | |
| 6,526,100 B1 * | 2/2003 | Kalliokulju et al. | 375/240.26 |
| 6,529,550 B2 | 3/2003 | Tahara et al. | |
| 6,704,846 B1 | 3/2004 | Wu et al. | |
| 6,829,301 B1 | 12/2004 | Tinker et al. | |
| 7,231,516 B1 | 6/2007 | Sparrell et al. | |
| 7,233,948 B1 | 6/2007 | Shamoon et al. | |
| 7,327,936 B2 | 2/2008 | Lecomte | |
| 2002/0126755 A1 | 9/2002 | Li et al. | |
| 2004/0019608 A1 | 1/2004 | Obrador | |
| 2004/0083364 A1 | 4/2004 | Andreaux et al. | |
| 2007/0079381 A1 | 4/2007 | Hartung et al. | |

FOREIGN PATENT DOCUMENTS

| | | |
|---|---|---|
| WO | 00/49483 | 8/2000 |
| WO | 01/65762 A1 | 9/2001 |

* cited by examiner

DEVICE FOR SECURE TRANSMISSION RECORDING AND VISUALIZATION OF AUDIOVISUAL PROGRAMS

RELATED APPLICATIONS

This is a continuation-in-part of U.S. application Ser. No. 10/501,858 filed Jul. 16, 2004, which is a §371 of International Application No. PCT/FR03/00122, with an international filing date of Jan. 15, 2003 (WO 03/063445, published Jul. 31, 2003), which is based on French Patent Application No. 02/00635, filed Jan. 18, 2002, the subject matter of which is incorporated by reference.

TECHNICAL FIELD

The present disclosure pertains to the secure processing, broadcasting, recording and display of video data and television programs or more generally any multimedia program or sequence using a MPEG type nominal stream format, by authorized users and proposes a secured system for the processing, broadcasting, delivery, recording, private copying and viewing of video or interactive multimedia programs and sequences.

BACKGROUND

The general problem is to provide a device capable of transmitting in a secure manner a set of high visual quality films in an MPEG type format directly to a television screen and/or to be recorded on the hard disk of a box connecting the remote transmission network to the television screen, while preserving the audiovisual quality but preventing any fraudulent use such as the possibility of making pirate copies of films or audiovisual programs recorded on the hard disk of the decoder box.

This disclosure also enables complete control of the use of the copies and the rights of the broadcast works.

With the presently available solutions, it is possible to transmit films and audiovisual programs in digital form via broadcast networks of the airwaves, cable, satellite, etc. type or via DSL (Digital Subscriber Line) type telecommunication networks or LRL (local radio loop) networks or via DAB (Digital Audio Broadcasting) networks. Moreover, in order to prevent pirating of works broadcast in this manner, these works are often encrypted by various means well known to the expert in the field.

However, the principal disadvantage of all of the presently available solutions (TiVo Inc., WO 01/65762) is that it is necessary to transmit not only the encrypted data to the users but also the decryption keys. Transmission of the decryption keys can be performed prior to, at the same time as or after transmission of the audiovisual programs. In order to increase the security and thus the protection of the audiovisual works against ill-intentioned use, the decryption keys as well as the decryption functions of the audiovisual decoders can comprise enhanced security means such as smart cards or other physical keys that can optionally be updated remotely.

Thus, the presently available solutions applied to a decoder box with the ability of local recording of audiovisual programs in digital form on a support of any type such as a hard disk or other type of memory provides an ill-intentioned user the possibility of making unauthorized copies of the programs recorded in this manner because at any given moment this user has with his digital decoder box associated or not with smart card systems all of the information, software programs and data enabling the complete decryption of the audiovisual programs. Precisely because of the fact that he possesses all of the data, the ill-intentioned user would have the possibility of making illegal copies without anybody becoming aware of this fraudulent copying when it is performed.

One solution would therefore consist of transmitting all or part of a digital audiovisual program solely on demand (on demand video services) via a broad-band telecommunication network of the DSL, cable or satellite type without authorizing the local recording of the audiovisual programs. The disadvantage here is completely different and stems from the performances of these network which do not make it possible to guarantee continuous streams of several megabits per second to each user as required by MPEG streams which require pass bands from several hundreds of kilobits to many megabits per second.

Under these conditions, one solution consists of separating the stream into two parts neither of which could be used by itself. Many patents have been filed in the context of this approach. We thus know from document WO 99/08428 (Gilles Maton) a method for the multi-application processing of a localizable active terminal in which there is implemented at least one link with an identifiable program dedicated to the execution of an application, said program dictating its operating conditions to the terminal for the setting up of its functions. The terminal dialogues in a multi-role manner with the management center for the implementation, if necessary, of the inputs and outputs of the capacities of this center with the management center optionally becoming the slave of the terminal at the application level in relation to the incoming program. This disclosure also pertains to the method for the identification of the program and the terminal in operating mode. This method of the prior art divides the stream into a part used for identifying the user and a part that contains the actual program itself. In particular, said program is not unusable but merely made inaccessible by the first part.

In addition, document EP 0778513 (Matsushita) describes a method enabling prevention of illegal use of an information unit by adding to it a control information unit in order to verify the rights of the user. The system makes it possible to remain permanently informed as to which part of the information unit is used and by which user and thereby to be informed as to whether or not this user is in an illegal position. This method thus makes the data secure by adding additional information units which distort the initial information.

Document WO 00/49483 (Netquartz) also provides us with methods and systems for creating a link between the users and an editor of digitized entities. The method comprises at least one of the following steps: the step of subdividing said digitized entity into two parts; the step of storing one part in memory in a server connected to a computer-based network; the step of transmitting the other part to at least one user who has available computer-based equipment; the step of connecting said computer-based equipment to said computer-based network; the step of establishing a functional link between said first part and said second part. These methods and systems do not specify whether the part stored in memory on the server can be stored by the user, which would enable the user to pirate said digitized entity.

Lastly, with regard to this approach, the closest state of the art is found in the patents of Hyper LOCK Technologies, the most pertinent of which is document U.S. Pat. No. 5,937,164. This disclosure uses the solution comprised of separating the stream into two parts, the smaller one of which holds an information unit required for the use of the larger part. This patent nevertheless is not sufficient for resolving the identified problem. In fact, suppression of a part of the stream distorts the format of the stream which then cannot be recognized as a standard stream that can be run with general software applications. This method of the prior art requires both a specific software program at the server side for the separation of the two parts, and another specific software program enabling not only the reconstruction of the stream but also the acquisition of the principal stream and its management according to a format proprietary to the solution. This proprietary format is not the initial format of the stream prior to separation into two parts in this known solution.

This company has also filed three other patents: document U.S. Pat. No. 5,892,825 returns to the approach of the preceding patent but in a narrower framework because the streams are still encrypted; document U.S. Pat. No. 6,035,329 is based on the same principle and pertains to a method enabling the reading of a CD-ROM or DVD-ROM disk contingent on the identification of the rights by the insertion of a smart card on which the information required for reading is stored. This method is still not adequate for our problem because it does not ensure that the modified stream is of the same format as the original stream. Finally, document U.S. Pat. No. 6,185,306 pertains to a method for the transmission of encrypted data from a Web site to a requesting computer. This method, however, makes it possible for the user to have available at a given moment the tools required for copying the data.

SUMMARY

We provide methods of distributing video sequences in a coded stream including a succession of frames, each frame consisting of at least one Intra coded sub-frame and at least one Prediction coded sub-frame corresponding to partial differences between at least two sub-frames of the succession of frames, comprising analyzing an original coded stream prior to transmission to at least one destination device, generating the least one modified coded sub-frame representing a visual identification, generating, based upon the analysis, a modified stream and a second stream, wherein said modified stream is obtained by replacing an original coded sub-frame by the modified coded sub-frame, so that the modification from said at least one original coded sub-frame results in a visually altered video sequence, said modified stream preserves the form for an encoding system applied to said original coded stream, and said second stream including the original coded sub-frame that allows a reconstruction from said modified stream to said original coded stream; transmitting the first and the second generated streams from a server to the destination device; and reconstructing the original stream by extracting from the modified stream the modified coded sub-frame by the original coded sub-frame contained in the second stream.

We further provide video-stream generating systems that generate a video stream as a coded stream including a succession of frames, each frame in turn consists of at least one Intraframe coded sub-frame (I slice) and at least one Prediction coded sub-frame corresponding to partial differences between at least two frames of the succession of frames, comprising at least one multimedia server which contains original video sequences; a generation device which generates at least one modified coded sub-frame representing a visual identification; an analyzing device that analyzes the video stream originating from an input/output server, said analyzing device detecting an original coded sub-frame in said video stream and generating two streams, one of which is a modified stream and the other of which is a second stream; wherein said modified stream includes the modified coded sub-frame generated by the generation device, said modified stream preserving the form of the encoding system applied to said original coded stream; said second stream including the original coded sub-frame that allows reconstruction from said modified stream to the original stream; and said video stream generating system, in response to a request from a user, separately transmits said modified stream and said second stream.

We further provide video-stream playing devices for playing a video stream as a coded stream including a succession of frames, each frame in turn consists of at least one Intra-frame coded sub-frame (I slice) and at least one Prediction coded sub-frame corresponding to partial differences between at least two frames of the succession of frames, comprising a stream decoder which decodes said coded stream; at least one recording interface which stores content of a modified stream including a modified coded sub-frame, which has been modified from said at least one original coded sub-frame and replaced by a modified coded sub-frame representing a visual identification so that a resulting video sequence is visually altered, said modified stream preserves the form of the encoding system applied to said original coded stream; at least one display interface; and a synthesizing unit that detects said modified coded sub-frame in said modified stream and reconstructs the original coded stream from said modified stream and a second stream that includes the original coded sub-frame.

DETAILED DESCRIPTION

In order to correct the different shortcomings of the prior art, this disclosure pertains in its broadest sense to a method for the distribution of video sequences according to a nominal stream format constituted by a succession of frames each comprising at least one I block corresponding to a complete digital I frame and at least one N block corresponding to the differences between one digital frame and at least one other frame, characterized in that there is performed prior to the transmission to the client's equipment an analysis of the stream in order to generate a modified stream presenting the format of a nominal stream and presenting modified N blocks and a second stream of any format comprising the digital information which can enable the reconstruction of said modified blocks, then of separately transmitting the two streams thereby generated from the server to the destination equipment, and in that there is calculated on the destination equipment a synthesis of a stream in the nominal format as a function of said first stream and said second stream.

Said synthesis advantageously produces a stream rigorously identical to the original stream, i.e., the process is without loss.

A video stream is made of a succession of N frames. These frames are of three types, I, P and B. According to one particular mode of implementation of this method, at least one N block corresponds to an N frame calculated by movement compensation in relation to the preceding N or I frame. The block and frame are then referred to as P block and frame (predicted).

According to another mode of implementation of this method, at least one block corresponds to a frame calculated by movement compensation in relation to the preceding and following P or I frames. The block and frame are then referred to as B block and frame (bidirectional).

In the case of P and B frames, a N block is necessarily of type B or type P.

According to one particular variant of this method, the nominal stream format is defined by the MPEG standard. 2 Jul. 14, 2005.

Said analysis can advantageously determine the N frames to be modified in order to obtain said first stream; these modifications can be: replace a N frame by another N frame (which could be random or having a particular content), invert two N frames of the same stream.

In one particular implementation of this method, the transmission of said first stream is implemented via a material support distributed physically such as a CD-ROM, a DVD or a hard disk.

In another implementation of this method, the transmission of said first stream is implemented via a broadband network (cable, satellite, optical fiber, airwaves) via a DSL (Digital Subscriber Line) type network, via a DAB network or via a local radio loop network (LRL).

According to the implementation of this method, the transmission of said second stream is implemented via a cable network, via a switched telephonic network (analog or digital), via a mobile telephonic network using the GSM, GPRS or VMTS standards, via an LRL network (local radio loop) or via a DSL network.

According to one particular variant of this method, transmission of said second stream is implemented via abroadband network of the same type as the network used for said first stream, or via the same network.

Transmission of one or both of the two streams is advantageously encrypted.

One or both of the streams can advantageously be watermarked.

According to one particular mode of implementation, reconstruction is contingent on a payment.

Reconstruction can also be authorized by consultation of a private copy demanded by the client.

This disclosure moreover pertains to an equipment unit for the creation of a video stream for the implementation of this method comprising at least one multimedia server containing the original video sequences and characterized in that it comprises a device for the analysis of the video stream stemming from said server in order to generate the two streams.

This equipment advantageously comprises a memory for recording a "private copy" marker indicating for each sequence the rights of each user: private copy that can be watched an unlimited number of times, private copy that can be watched a limited number of times and specification of that number, and private copying prohibited.

This disclosure moreover pertains to equipment for the management of a video stream for the purpose of implementing this method comprising a standard stream decoder, at least one recording interface (hard disk, flash memory, etc.) intended to store the contents of said first stream and/or a disk reader (CD, DVD, etc.) and at least one display interface (standard screen, wireless screen, video projector), characterized in that it comprises a means for the recomposition of the original stream from the two streams.

According to one particular mode of implementation, said means is a software application installed in the equipment.

According to another mode of implementation, said means is a fixed electronic device.

According to another mode of implementation, said means is a portable or mobile electronic device.

According to a mode of implementation in which the equipment is installed on a computer, said means uses a resource specific to the product (card) so as to prevent the copying of the temporary information of the second stream onto a permanent support.

Said recording interface advantageously also stores a "private copy" marker in relation to said first stream indicating for this sequence the rights of the user: private copy that can be viewed an unlimited number of times, private copy that can be watched a limited number of times and specification of that number, private copying prohibited.

The equipment advantageously comprises a smartcard reader for identifying the user.

The equipment advantageously comprises a smartcard reader, the smart card containing the software applications and/or the data of said second stream.

One variant of implementation consists of implementing the client equipment in the form of two means interconnected by a physical link or a remote link (Bluetooth, AirPort, WiFi, infrared, etc.). According to this variant, the equipment for the management of a video stream comprises a first means constituted by a personal computer of a communication interface for receiving a video stream originating from a communication network or a physical support reader, and equipped with at least one recording means [hard disk] intended to store the content of said first stream, and a second means constituted by a decoder comprising a display interface, means for communication with said principal computer for receiving said first stream transmitted by the computer and communication means for receiving said second stream, as well as a means for the recomposition of the original stream from the two streams.

According to a first mode of implementation, said means for the recomposition of the stream is a software application installed solely on said decoder.

According to a second mode of implementation, said means for the recomposition of the stream is an electronic device installed solely on said decoder.

Lastly, this disclosure pertains to a system for the transmission of a video stream, characterized in that it comprises an equipment unit for production of a video stream, at least one equipment unit for management of a video stream and at least one communication network between the production equipment and the management equipment.

Figure 1:
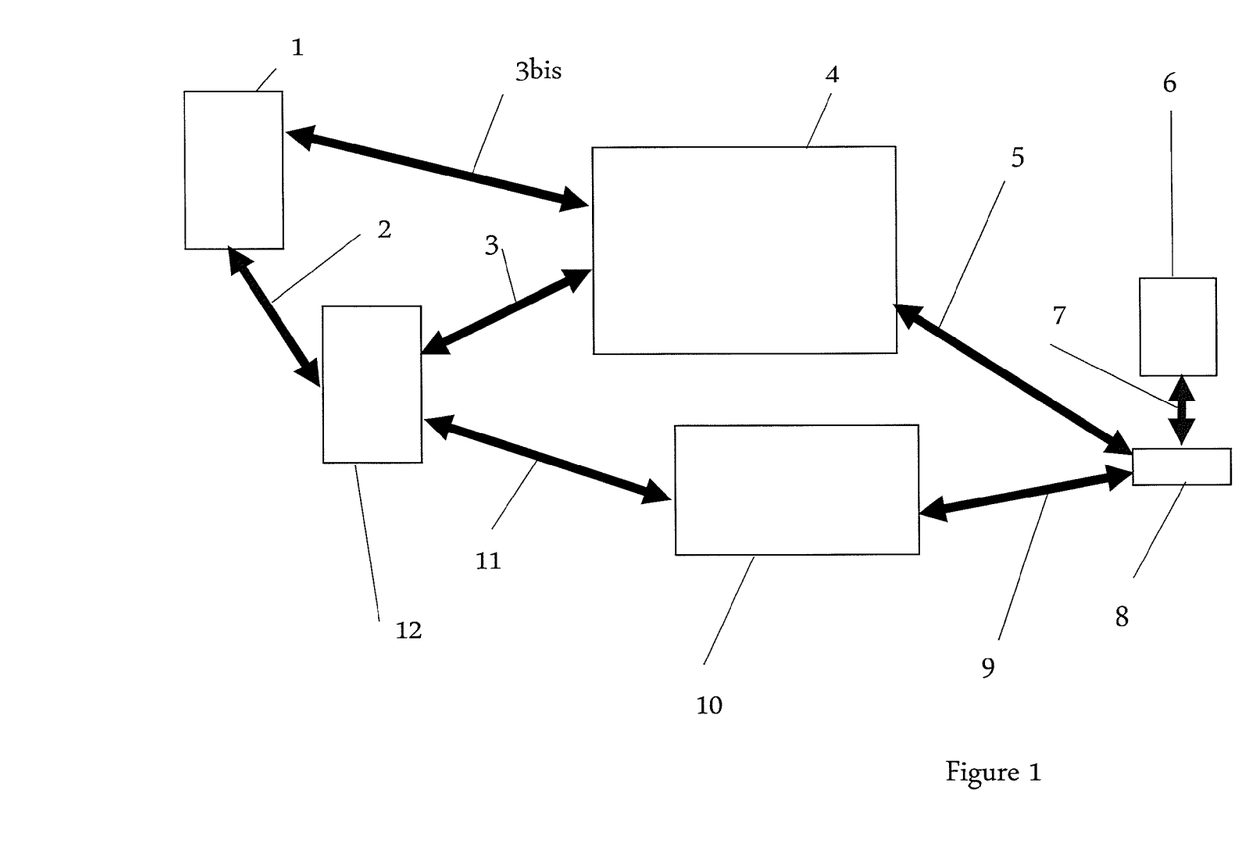
FIG. 1 in the attached drawings is a diagram of a distribution system.
Figure 2:
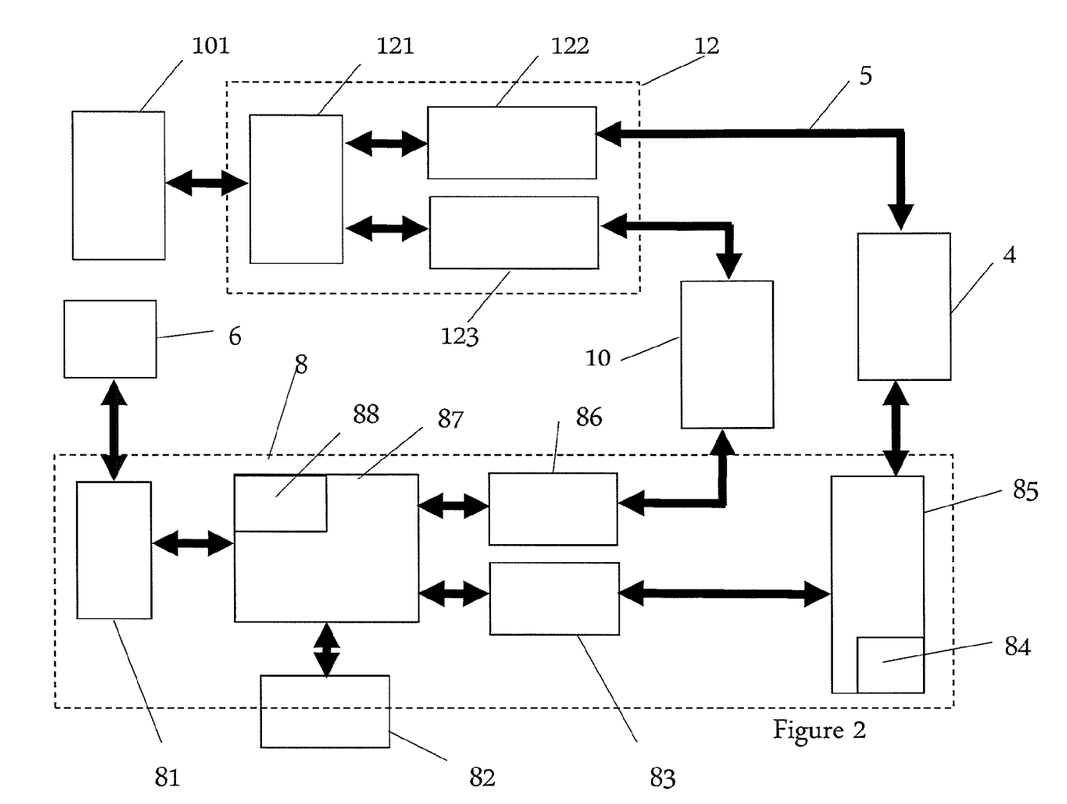
FIG. 2 represents a particular mode of implementation of an exemplary system for the analysis and synthesis of MPEG stream.
Figure 3:
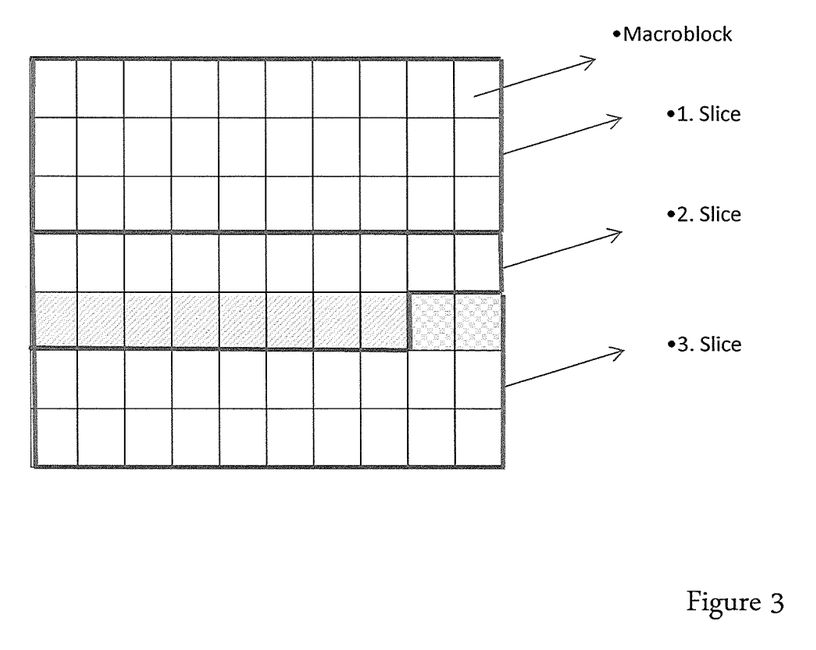
FIG. 3 illustrates the slice structure of a video-frame. Conserving all the properties of a frame, slice is targeted as the independent unit of processing in a preferred example.

Better understanding of this disclosure will be obtained from the description below of a nonlimitative example of implementation with reference to the attached drawings in which:

FIG. 1 describes the architecture of a system for the implementation of the method according to this disclosure;

FIG. 2 represents one particular mode of implementation of the system for the analysis and synthesis of MPEG type stream and the FIG. 3 represents Video frame divided into 3 separate regions: 3 sub-frames.

This disclosure pertains to a stream of data of a nominal format especially but not exclusively a stream of the MPEG type. The format of the audiovisual stream used must have the following characteristics:

this format must break down the data into frames, each frame comprising a complete digital I frame and at least one P frame calculated by coding the differences (movement compensation) between this frame and the preceding I or P frame;

optionally, each frame comprises at least one B frame calculated by coding the differences (movement compensation) between this frame and the preceding and following I and/or P frames.

In the description below the example pertains to an MPEG stream; this does not however constitute a limitation on the scope of protection.

The general principle of a method to ensure the security of a video stream is presented below. The objective is to authorize on demand video and upon demand via all of these broadcasting networks and the local recording in the user's digital decoder box. The solution consists of permanently preserving outside of the user's habitation, in fact in the broadcasting and transmission network, a part of the recorded audiovisual program, this part being essential for viewing said audiovisual program on a television or monitor screen, but being of very small volume in relation to the total volume of the digital audiovisual program recorded by the user. The missing part will be transmitted via the broadcasting and transmission network at the time of viewing said digital audiovisual program prerecorded by the user.

The greatest part of the MPEG audiovisual stream will thus be transmitted via a conventional broadcast network while the missing part will be sent on demand via a narrow-band telecommunication network such as conventional telephone networks or using a small part of a DSL or LRL type network, or using a subset of the shared pass band on a cable network.

In FIG. 1, the video interface (8) setup is adapted for connecting at least one display device, e.g., a monitor, a video projector or a television screen type device (6) to at least one broad-band transmission and broadcasting network (4) interface and to at least one telecommunication network interface (10). According to this disclosure, this set up is composed of a module (8) comprising principally a suitable processing unit for processing, in particular decoding and unscrambling, all MPEG type video streams according to a preloaded decoding and unscrambling software program in real or delayed time, of storing it, recording it and/or transmitting it on a telecommunications network, as well as a screen interface (7) and an interface for connection to a local or extended area network (5) and/or (9). The broadband transmission and broadcasting network (4) and the telecommunication network (10) can be a single network.

The hard disk of the module (8) can be used as a buffer memory for momentarily storing at least a part of the video program or sequence to be displayed in the case of delayed display or of limitation in the pass band of the transmission network. Viewing can be delayed or differed upon request of the user or the portal (12).

As shown in FIG. 1, the connection interface (5) is linked to a broad-band transmission and broadcasting network (4) such as a modem, a satellite modem, a cable modem, an optical fiber line or a radio or infrared interface for wireless communication.

It is by means of this conventional video broadcasting link that the contents of audiovisual programs such as films will be transmitted. Nevertheless, in order to prevent the possibility of pirate copies, prior to transmitting the audiovisual content from the server (1) or portal (12) it is provided to hold back a small part of the audiovisual content in the portal (12).

In the case of viewing an audiovisual program in real time, this small part of the audiovisual content preserved in the portal (12) will also be sent to the module (8) via the telecommunication network (10).

Since the successive frames of a video sequence contain a large number of identical visual elements (as with cinema, an frame resembles the preceding frame), MPEG only records the elements that differ from the original frame. Thus, there is preserved an entire reference frame and, for the successive frames, only the modifications are retained.

Thus, the MPEG compression commences initially by breaking down the frame into different square matrices comprising multiple points or pixels, each having its own colorimetric value. A calculation makes it possible to obtain an average value for each matrix within which each point is maintained in embedded form. This process generates a pixilation and the appearance of uniform tints where tint nuances previously existed. The second step of the MPEG compression consists of preserving from one frame to another only the changing elements.

In order to obtain animated frames, the principle consists of capturing several frames in time, while the intermediary frames are calculated from these frames. Analysis of the complete reference frames (referred to as I frames-Intraframe frames) enables prediction of the intermediary P frames (Predicted frames). Then, the B frames (Bidirectional frames) are intercalated between the reference frames and the predicted frames.

Three major types of frames are thus defined in order to respond to the contradictory demands of a possibility of direct access and a high compression efficacy.

1. The Intra coding frames (I frames) are coded without reference to the other frames. They provide the access points to the coded sequence in which the decoding can commence but are coded with a moderate compression rate.

2. The Prediction coded frames (P frames) present a more effective coding using a movement-compensated prediction after a prior intra (I) or predicted (P) frame, and are generally used as reference for a future prediction.

3. The frames coded by Bidirectional prediction (B frames) provide the highest compression rate, but require 4 Jul. 14, 2005 for movement compensation a prior reference frame and a future reference frame. The frames coded by bidirectional prediction are never used as prediction reference.

The organization of the three kinds of frames in a sequence is very flexible: its selection is left to the coder and depends on the requirements of the application.

When it reads the binary train, a conventional MPEG decoder identifies the beginning of a coded frame, then the type of frame. In order to avoid any confusion between a standard decoder box (often referred to as a "Set Top Box" or STB), the standard MPEG decoder will be referred to as the "Reader" ("Player" or "Viewer") in the document below. This Reader can be implemented in hardware or software form. The MPEG reader decodes successively each macro block of the frame. The frame is reconstructed when all of its macro blocks have been processed. In the case of an I frame or a P frame, it constitutes a reference frame for the subsequent frames and it is stored in the place of the oldest reference frame. The frames are thus available in digital form for post-processing and display, according to the application.

In the case of an MPEG type audiovisual program, it is provided to not transmit all of the B and/or P frames originating from the server (1) or the portal (12) to the module (8). These B and/or P frames being retained in the portal (12). To the contrary, in the place of the untransmitted B and/or P frames, the device according to this disclosure intercalates false B and/or P frames of the same type as there moved B and/or P frames and retained in the portal (12) such that the standard MPEG Reader of the module (8) is not disturbed by these modifications that it will be unaware of and it will reconstitute as output an outgoing MPEG stream that will be incorrect from the visual point of view for a human being but correct from the MPEG format point of view.

The MPEG Reader of the box (8) is a standard MPEG Reader and has not been changed in any way or affected by the changes performed on the B and/or P frames.

According to one particular mode of implementation, in order to increase the efficacy of the protection system it is preferable to not send the B and/or P frames which are closest to and which follow the I frames of the MPEG stream. For even greater efficacy, after analysis of their volume and their weight in octets or in bits, B and/or P frames will be selected to not be transmitted but retained in the portal (12).

According to one particular mode of implementation, certain P and/or B frames will be permuted among each other.

As shown in FIG. 1, the connection interface (9) is linked to an extended telecommunication network (10) directly or via a local network serving as access network and it is constituted, e.g., by a subscriber line interface (analog or digital telephonic network, DSL, LRL, GSM, GPRS, UMTS, etc.).

Thus, the audiovisual programs are broadcast in a conventional manner in multi diffusion mode ("broadcast") via the broad band transmission network (4) of the airwaves, cable, satellite, digital airwaves, DAB, DSL type, etc., from the server (1) directly via the link (3 bis) or via the portal (12) via the link (2) and (3) to the decoder module (8) by means of the link (5). Each audiovisual program broadcast in this manner can be optionally encrypted and in accordance with this disclosure, the MPEG stream contains modifications at the level of the B and/or P frames as described above. As a function of the parameters selected by the user or of the information transmitted by the broadcast server, certain audiovisual programs modified in this manner and incomplete are recorded on the hard disk of the box (8).

When the user wants to watch an audiovisual program recorded in this manner on the hard disk of his box (8), he issues the command in the conventional manner via the remote control linked to his box (8) which then connects automatically to the portal (12) via the link (9) of the local network or direct access type and via the telecommunication network (10) which is itself linked to the portal (12) via the link (11). During the entire displaying of the audiovisual program, the links (9) and (11) remain connected and allow the box (8) to receive the missing B and/or P frames as well as the algorithms, functions and parameters for restoring the order of the B and/or P frames. The B and/or P frames transmitted in this manner are never recorded on the hard drive of the box (8) but are directly displayed on the display screen (6) via the link (7) after having been processed by the Reader of the box (8) from its local volatile memory. Once they have been processed and displayed, the B and/or P frames having been transmitted by the portal (12) will be erased from the local volatile memory of the box (8).

According to a particular mode of implementation, the P and/or B frames broadcast in this manner can be optionally encrypted by any existing or future encryption means. The same is true for the algorithms, functions and parameters for restoring the order of the B and/or P frames.

Each time that the user wants to watch a program recorded on the hard disk of the box (8), the box (8) will connect automatically to the portal (12). The same is true when the user pauses, the transmission of the B and/or P frames originating from the portal (12) will be interrupted until the restarting of the display, thus ensuring that not all of the information units of an audiovisual program will be found in the box (8) at a given moment and thereby preventing an ill-intentioned person from making pirate copies of these recordings.

According to a particular mode of implementation, the box (8) comprises a smart card reader which enables the portal (12) to authenticate the user owner of the box (8). If this is authorized, this function also allows the user to make private copies of the audiovisual programs recorded on the hard disk of his decoder box (8). In order to do this, if the user wants to make a private copy of an audiovisual program, he does so in the conventional manner on a VCR via the link (7) that connects the box (8) to the display screen (6).

However, if the user wants to preserve a private copy on the hard disk of his box, he will so inform the box (8) which will record the "private copy" information unit as well as the coordinates of the user which are on the smartcard in a particular field (84) of this audiovisual program recorded on the hard drive (85) of the decoder box (8). Whenever the user subsequently wants to watch this private copy, the box (8) will connect automatically to the portal (12) and inform the box that the user wants to implement a reading of his private copy; in response, if the reading of the 5 Jul. 14, 2005 private copy is possible for this user who possesses this smart card linked to this box (8), the decoder box (8) will then receive the missing frames as well as all the other information enabling the display of the audiovisual program constituting the private copy.

According to another mode of implementation, if the user wants to preserve a private copy on the hard drive of his box, he will so inform the server which will record the information unit "private copy" for this program and for this user authenticated by the smart card. Each time that the user wants to watch this private copy, the box (8) will then connect automatically to the portal (12) and will inform this portal that the user wants to implement a reading of his private copy; in response, if the reading of the private copy is possible for this user who possesses this smart card and for this program, the decoder box (8) will then receive the missing B and/or P frames as well as all of the other information enabling the viewing of the audiovisual program constituting the private copy.

According to a particular mode of implementation, the so-called private copy could enable the user to watch this same audiovisual program in an unlimited manner or a number of times determined in advance by the service provider who authorized this private copy.

The present disclosure also pertains to the physical box (8) used by the consumer to access the data. This physical box is located at the user's domicile. It provides a set of functionalities which manage the appropriate information to be presented according to the audience's selection and manages the connection and communication with the remote server.

According to a particular mode of implementation, the physical box corresponding to the video interface setup (8) is implemented as a fixed autonomous device with integrated hard disk.

According to another particular implementation, the video interface setup (8) is implemented as an add-on card which would be installed in a PC-type computer and would be linked to at least one broad-band transmission and broadcasting network interface (4) and to at least one telecommunication network interface (10). This card would use the hard disk of the PC for recording the first stream, but would have its own calculator and its own volatile memory so as to not allow the ill-intentioned user of the PC the means to access the complementary information units such as the B and/or P frames of the second stream.

According to the present disclosure, the video and multimedia servers (1) and/or (12) comprise the means for coding, transcoding and scrambling of video data, in particular the means for adding cryptographic and security information units at the beginning and all along the sequences.

It lastly should be noted that the disclosed methods and systems degrade the MPEG stream from the visual point of view until no longer allowing recognition of the transmitted and displayed scenes without having access to the complementary data and characteristics, but completely reconstitutes the MPEG stream in the video interface setup (8) without any loss.

Although the present disclosure has focused most particularly on audiovisual data, it is understood that all interactive multimedia information and all interactive data can be processed by the present setup and the present system, MPEG type video data being the most elaborated. Better understanding of the disclosed methods and systems will be obtained from the description below presenting the physical basis thereof and with reference to FIG. 2 of the attached drawings representing a preferred mode of implementation of this latter setup as a nonlimitative example of implementation particularly suitable for cable and satellite networks. The complete MPEG stream (101) is analyzed by the analysis device (121) of the portal (12) and will thus be separated into an MPEG type stream but whose B and/or P frames will have been processed and sent via the output (122) of the portal to the broad band transmission and broadcasting network (4).

The other part of the modified MPEG stream will be stored in memory in the buffer memory (122) of the portal (12). For each MPEG stream broadcast in this manner, the portal (12) will store in a buffer memory (122) the modifications that were implemented in this MPEG stream by the analyzer (121) of the portal (12). It should be clarified that for the same incoming MPEG stream (101) the processing of the stream can be different for each user (8) and/or for each group of users (8). Thus, the buffer (123) of the portal (12) comprises a different memory zone for each user.

In the implemented examples, for a first user (8) each first P frame of the MPEG stream which follows an I frame was replaced by a random P frame of the same type and same volume as the P frame removed in this manner. It has been found that the degrading effects on the output stream are very intense.

For a second user (8) the nth P frame that follows each I frame of the MPEG stream was permuted by and with the first B frame that follows this P frame. It has been found that this permutation is very effective for MPEG type animated sequences compared to MPEG sequences presenting little animation.

We will now describe in detail the different steps for this first user.

The portal (121) selected the MPEG stream (101) that it must transmit to the user (8) to be watched on a delayed basis on his television screen (6). This user is linked to a digital cable broadcast network (4) offering video on demand (VOD), the network (10) is thus the same as the network (4). The analysis system (121) of the portal (12) will thus read the incoming MPEG stream (101) and each time that it detects an I frame, it searches for the first P frame that follows this I frame so as to replace it with a random P frame that it calculated. According to another embodiment, the I frame itself is replaced by a random frame. The new modified MPEG stream is then recorded in the output buffer (122) to be broadcast on the broadcast network (4) via the link (5). The frames removed from the incoming MPEG stream (101) are stored in the buffer memory (123) of the portal. In the implemented example, rather than substitute each P frame that follows an I frame, the analysis system (12) only takes one I frame out of n in which n is a random number comprised between 1 and 7.

When the analysis system (121) writes the substituted frame in the buffer memory (123), it also writes the number of the I frame that precedes the thereby substituted P frame. The analysis system (121) continues its analysis until the end of the incoming MPEG stream.

During this time and in a completely unsynchronized manner, the outgoing modified MPEG stream originating from the output buffer (122) of the portal (12) is broadcast via the broad band network (4) to one or more users (8).

Each decoder box (8) that wants to record this MPEG stream modified in this manner can then read this MPEG stream and record it on its hard disk (85). This recording initiative is left to the decoder (8) under the control of the portal (12). In order to perform this, the analysis system (121) had written at the beginning of the MPEG stream an information unit of supplementary data that specified the addresses of this modified MPEG stream. The addressees can thus be a particular and single addressee (8), a group of addressees (8) or the totality of the decoders (8) linked to the network (4).

The phase described above corresponds to the first phase of preparation of the MPEG stream by the portal (12), its transmission via the broad band network (4) and its recording in a decoder (8). This decoder can then display this MPEG stream recorded on its hard disk (85). In order to perform this, the synthesis system (87) of the decoder (8) will read the MPEG file from its hard disk (85) and will send it to a conventional MPEG reader (81). If no complementary data is received by the synthesis system (87), then the MPEG stream which reaches the reader (81) is processed and displayed as it is, which causes a huge distortion of the display on the display screen (6). In effect, the substituted frames which are processed by the synthesis system (87) do not correspond to the frames which are required for a correct viewing because certain frames were replaced by random frames. In contrast, since the recorded stream is definitely an MPEG type stream, the reader (81) does not discriminate and displays the information on the output screen (6) where it gives the appearance of an MPEG video stream but which is totally incoherent for the human being who watches the screen (6). Any copy of the MPEG stream originating from the hard disk (85) of the box (8) would produce the same visual effect when it is reconstituted by any MPEG reader; all uses of this copy which would be ill-intentioned are thus doomed to failure.

When the user of the decoder (8) wants to correctly display on his screen (6) the audiovisual program recorded on his hard disk (85), he sends his request to the synthesis system (87) with his remote controller as he would with a VCR or DVD reader presenting a menu on his television screen. The synthesis system (87) then issues a request to the hard disk (85) and commences to analyze the modified MPEG stream originating from the hard disk (85) via the reading buffer (83). The synthesis system (87) then establishes a link with the portal (12) via the telecommunication network (10) which in our example is also the cable network, but which can be a conventional telephone network or a DSL link. Once this link has been established, and during the entire duration of watching the film or audiovisual program, the synthesis system (87) draws out from the buffer memory (123) of the server (12) the substituted frames and the data corresponding to the positions of these substituted frames in relation to the first frame of the Group of Picture (GOP) of the stream recorded on the hard disk. These frames and these position data are drawn out from the synthesis system (87) via the input buffer memory (86) and are stored temporarily in the volatile memory (88) of the synthesis system (87). From the modified MPEG stream that is drawn out via the buffer (83) and from the frames and the associated data that are drawn out via the buffer (86) in the memory (88), the synthesis system reconstitutes, in reverse manner of the previously described analysis process, the frames substituted by the real frames and sends the thereby reconstituted new MPEG stream to the reader (81) to be displayed correctly on the screen (6). Upon their use, the frames to be substituted and the data associated with these frames are erased from the volatile memory (88).

In the implemented example, before the portal (12) authorized the transmission of the P frames and the associated data from its buffer (123), the portal (12) had verified that the user of the box (8) was in fact authorized to receive them. In order to implement this step, the portal (12) reads the information contained on the smart card (82) of the box (8) and verifies that the user is in fact authorized to watch this audiovisual program. It is not until this verification has been performed that the frames and the associated data are sent from the buffer (123) to the box (8) corresponding to this user.

In the implemented example, the user had made a private copy of his audiovisual program. The synthesis system (87) therefore wrote complementary data on a part (84) of the hard disk (85) as well as the number of the smartcard (82) and the information unit "private copy" as data associated with this audiovisual program. Upon the next private reading of this audiovisual program, the synthesis system (87) will analyze these associated data and then inform the portal (12) that the user of the decoder (8) is implementing a reading of the private copy. If this function is authorized for this user (8) by the portal (12), the P frames and the associated data will then be sent by the portal (12) to the buffer (86) as described above. In the contrary case, the data will not be sent and the user of the decoder (8) will not be able to watch the reconstituted MPEF stream.

We will now describe in detail the different steps for the second user (8).

In this second case, the broadcast network (4) is a satellite network and the telecommunication network (10) is an airwaves system of the local radio loop (LRL) type.

In a manner identical to the description above, the user of the decoder (8) will receive the MPEG streams and the complementary data from the portal (12). In contrast, before sending the MPEG stream from the output buffer (122), the analysis system (121) will read the incoming MPEG stream (101) and drawing a random number n comprised between 1 and 4, the synthesis system permutes the nth P frame which follows each I frame of the MPEG stream with the first B frame that follows this P frame. Each random number used in this manner is recorded in the buffer memory (123) of the portal (12).

During the reconstitution of the MPEG stream by the synthesis system (87) of the decoder (8), the reading of these random numbers from the portal (12) and the reading of the MPEG stream modified in this manner from the hard disk (85) of the box (8) enables the synthesis system (87) to restore the B and P frames in the correct order and send all of it to the reader (81).

According another example, the substituted frame in the original stream is not a random frame but contain a visual identification. The generation device receives an identifier and converts it in a visual frame corresponding to the original frame at the time (or period) of replacement.

According to an example, the converted identification is tended to determine uniquely either:
an originator of the original stream (101),
  one of or altogether the servers of the portal (12),
  the destination device (8),
  one of the characteristics or the nature of the transmission channel (4) (10) of the first and/or the second stream. For instance, the identification of broadcaster of the transmission (4), the bandwidth indicator of the transmission (10) can be candidates for the above identifier. Whenever the generation device should remove one frame to replace by a substitute frame, we have two cases leading to different behavior.

1. The substituted frame is an I frame. In this case, the analysis will simply replace the I frame from the original stream by the generated visual I frame. The size of the modified frame can be adjusted to the size of the original frame, in particular in the case that the original size is larger than the size of the modified frame. This adjustment can be made by removing high frequency coefficients in the macro blocks of the modified frame. The quantization parameter can be also set to a rougher level to increase the compression-rate, hence compensating the excess size.

2a. The substituted frame is a P or B frame, i.e. a prediction frame. The generation device should now calculate a modified prediction frame taking into account the resulting image at the time the prediction frame is removed from the original stream. For that purpose, the generation device reconstructs the resulting image at the time of the substituted frame taking into account all the associated reference frames (the last I frame and probably a preceding P frame). With the resulting image, the generation device can calculate a modified prediction image by calculating the difference between the image containing the visual identification and the resulting image. The modifications are coded to form a modified prediction image that will replace the original prediction image of the original stream. If the substituted frame is a P frame, such modification may produce a chained degradation on the following frames using that P frame as a predictor. The problem will be resolved itself at the decoder (8) when the substituted frame is recovered.

2b. The substituted frame is a P or B frame, i.e. a prediction frame. Instead of reconstructing the resulting image corresponding to the image at the time of the removal of the prediction frame, the resulting image is simply calculated by the difference between the image containing the visual identification and the last I frame preceding the removed prediction frame, which can be quickly decoded. The quality of the visual representation of the modified prediction frame will likely contains some jerky-effect since the calculation does not take into account the intermediate prediction frames. However, for the purpose of this disclosure, the visual degradation of the identifier is acceptable.

Bearing in mind that the term "frame" or "band" of image used throughout the description can be understood as a smallest image-entity which can be encoded/decoded independently. In the scope of MPEG standard, they inspire the concept of "slice," actually a partial region—sub-frame—of a conventional frame. Hereafter, the term slice and sub-frame are used interchangeably. From the viewpoint of encoding/decoding, the purpose to divide a frame into several independent slices is to facilitate the error resilience of compressed media stream. In case of missing or erroneous received data, only the associated slice (sub-region) of the image is lost, other region of the frame on question is still correctly handled.

According to MPEG-2 standard, a slice is a series of an arbitrarily number (at least one) of consecutive macro blocks. Slices shall not overlap. The position of slices may change from picture to picture. In the most general case, it is not necessarily for the slices to cover the entire picture. In such a case, it is a requirement that if the picture is subsequently used to form a prediction, the predictions shall only be made from those regions of the picture that were enclosed in slices. However, in certain defined levels of defined profiles in MPEG-2, every macro block in the picture shall be enclosed in a slice. The first and last macro block of a slice shall be in the same horizontal row of macro blocks.

MPEG-4 standard releases some constraints of the "slice" concept defined in MPEG-2. With the introduction of Arbitrary Slice Order (ASO), the slices can be overlapped and positioned flexibly over a given image frame.

Slice can be an Intra slice, a Predicted slice or a Bidirectional slice. The containing frame indeed inherits these properties to become intra, predicted or bidirectional respectively. Thanks to the equivalence of the two concepts, slice can replace the role of frame in each embodiment of the current application described above to further improve the demonstrative implementation. For instance, to calculate a replaced slice with randomizing algorithm is faster than a replaced frame whose size in macro blocks is multiple of a slice's. Storing an original slice in the secondary stream is also less cumbersome than storing the whole containing frame (especially for the I frame). For inserting a visual identification, dealing with only a partial region of image—the slice over which the visual identifier is embedded—instead of the whole frame will reduces drastically the complexity of generating the replaced slice.

What we claim is:

1. A method of distributing video sequences in a coded stream including a succession of frames, each frame consisting of at least one Intra coded sub-frame and at least one Prediction coded sub-frame corresponding to partial differences between at least two sub-frames of the succession of frames, comprising:
analyzing an original coded stream prior to transmission to at least one destination device,
generating the least one modified coded sub-frame representing a visual identification,
generating, based upon the analysis, a modified stream and a second stream,
wherein said modified stream is obtained by replacing an original coded sub-frame by the modified coded sub-frame comprising a modified Prediction coded image that is a randomly generated image or the result of swapping two Prediction coded images, so that the modification from said at least one original coded sub-frame results in a visually altered video sequence, said modified stream preserves the form for an encoding system applied to said original coded stream, and said second stream including the original coded sub-frame that allows a reconstruction from said modified stream to said original coded stream;
transmitting the first and the second generated streams from a server to the destination device; and
reconstructing the original stream by extracting from the modified stream the modified coded sub-frame by the original coded sub-frame contained in the second stream.

2. The method according to claim 1, wherein said original coded sub-frame is a Prediction coded sub-frame which is an interframe Prediction coded sub-frame and/or a bidirectional Prediction coded sub-frame calculated by motion compensation from a sub-frame located in a previous or subsequent frame.

3. The method according to claim 1, wherein it comprises the steps of:
obtaining an identifier identifying either,
an originator of the original stream,
the server,
the destination device,
the characteristics of the transmission channel of the first and/or the second stream;
said identifier being used to generate the visual identification of the modified coded sub-frame.

4. The method according to claim 2, wherein the generation of the modified coded sub-frame comprises:
calculating a visual reference sub-frame from the identifier,
generating the modified Prediction coded sub-frame by calculating the difference between the said original coded sub-frame and the visual reference sub-frame.

5. A video-stream generating system that generates a video stream as a coded stream including a succession of frames, each frame in turn consists of at least one Intraframe coded sub-frame (I slice) and at least one Prediction coded sub-frame corresponding to partial differences between at least two frames of the succession of frames, comprising:
at least one multimedia server which contains original video sequences;
an generation device which generates at least one modified coded sub-frame representing a visual identification;
an analyzing device that analyzes the video stream originating from an input/output server, said analyzing device detecting an original coded sub-frame in said video stream and generating two streams, one of which is a modified stream and the other of which is a second stream; wherein said modified stream includes the modified coded sub-frame generated by the generation device, said modified stream comprising a modified Prediction coded image that is randomly generated or the result of swapping two Prediction coded images so that the modified Prediction coded image results in a visually altered video sequence and preserves the form of the encoding system applied to said original coded stream; said second stream including the original coded sub-frame that allows reconstruction from said modified stream to the original stream; and said video stream generating system, in response to a request from a user, separately transmits said modified stream and said second stream.

6. The video-stream generating system according to claim 5, wherein the generation device obtains an identifier identifying either:
an originator of the original stream,
the server,
the user,
the characteristics of the transmission channel of the first and/or the second stream said identifier being used to generate the visual identification of the modified code sub-frame.

7. A video-stream playing device for playing a video stream as a coded stream including a succession of frames, each frame in turn consists of at least one Intra-frame coded sub-frame (I slice) and at least one Prediction coded sub-frame corresponding to partial differences between at least two frames of the succession of frames, comprising:
a stream decoder which decodes said coded stream;
at least one recording interface which stores content of a modified stream including a modified coded sub-frame, which has been modified from said at least one original coded sub-frame and replaced by a modified coded sub-frame representing a visual identification and comprising a modified Prediction coded image that is randomly generated or the result of swapping two Prediction coded images, so that a resulting video sequence is visually altered, said modified stream preserves the form of the encoding system applied to said original coded stream;

at least one display interface; and a synthesizing unit that detects said modified coded sub-frame in said modified stream and reconstructs the original coded stream from said modified stream and a second stream that includes the original coded sub-frame.

* * * * *